UNITED STATES PATENT OFFICE.

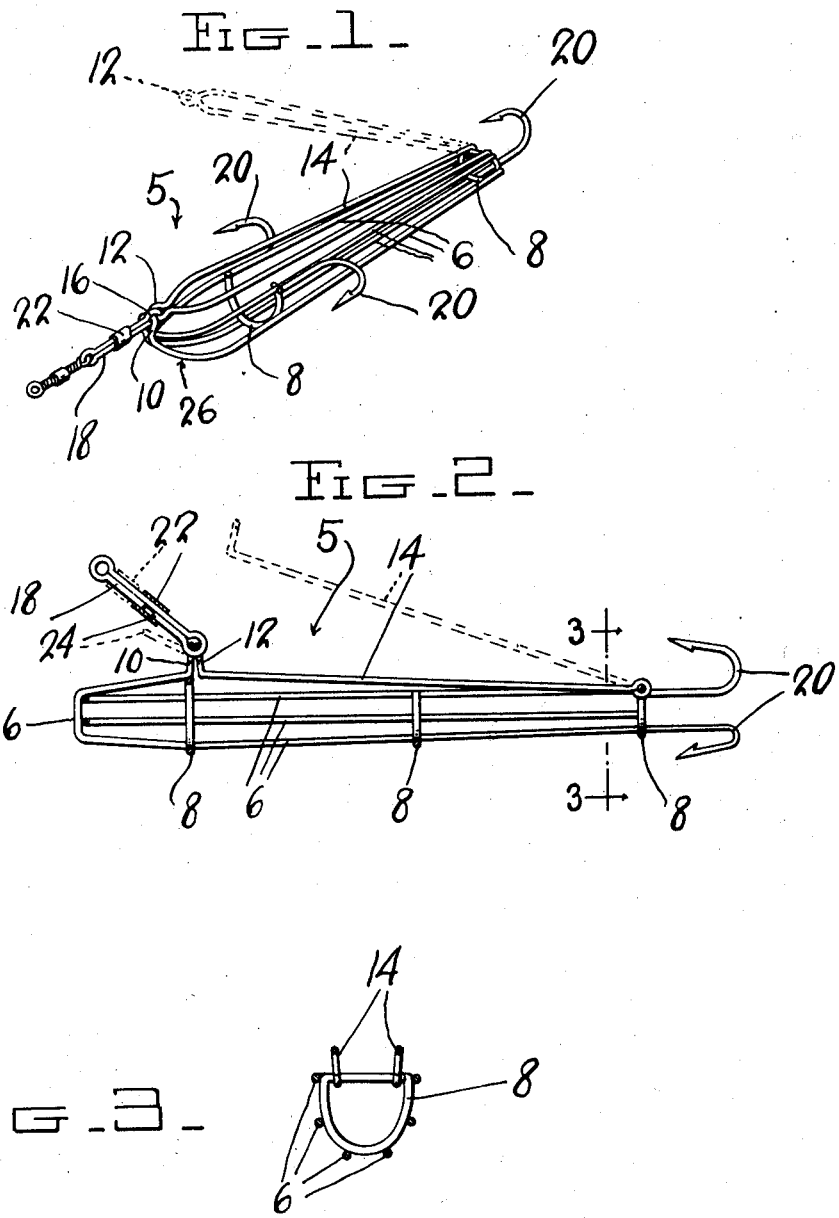

CHARLES L. SMITH, OF REGAN, NORTH DAKOTA.

FISH-LURE.

1,338,877. Specification of Letters Patent. Patented May 4, 1920.

Application filed July 10, 1919. Serial No. 309,863.

*To all whom it may concern:*

Be it known that I, CHARLES L. SMITH, a citizen of the United States, residing at Regan, in the county of Burleigh and State of North Dakota, have invented certain new and useful Improvements in Fish-Lures, of which the following is a specification.

This invention relates to fishing tackle and more particularly to a fish lure.

One of the objects of this invention resides in the provision of a fish lure that is adapted to expose live bait to the attack of the fish to be caught and yet protect the bait from consumption by the fish.

With this and other objects in view this invention resides in certain novel features of construction and arrangement of parts to be more fully set forth in the specification herewith and pointed out in the appended claims, it being understood that the right is reserved to resort to such departures from the present disclosure as come within the scope of the claims.

In the accompanying drawing:—

Figure 1 is a perspective view of a fish lure constructed in accordance with this invention;

Fig. 2 is a longitudinal sectional view through a fish lure showing a modification in the construction thereof;

Fig. 3 is a detail sectional view on line 3—3 of Fig. 2.

In the present embodiment of this invention, the numeral 5 designates a fish lure consisting of a plurality of longitudinally extending wire ribs 6 which are braced by stays 8 that are suitably secured thereto.

Certain of said ribs 6 have their forward portion bent to form a securing eye 10 that coacts with a securing eye 12 on a hinged cover 14 to receive the loop 16 of a connecting link 18 that locks the cover in closed position and supports the lure on the fishing line.

Securely fastened to the lure are a plurality of hooks 20 which are disposed in such position that the fish will readily be snagged upon attempting to attack the live bait within the lure.

In order to lock the link 18 after having engaged its loop 16 with the securing eyes 10 and 12, a slidable sleeve 22 on the link is forced over the end 24 of one arm of the link and through the resiliency of the arms of the link it is frictionally retained in an immovable position.

In Fig. 2 the lure is constructed of ribs and stays similar to those formerly disclosed, with the exception that the nose 26 of the lure projects forwardly beyond the cover and the eyes on the cover and ribs extend substantially at right angles to the body of the lure where they are disposed above the bait.

In order to make the aforesaid lure conspicuous it will be painted a bright color and upon placing the live bait therein, the fish will be quickly attracted toward the same.

With a fish lure constructed in accordance with this invention it is manifest that the bait will remain in a protected position from the fish and since the maximum results are obtained by using live bait, it is apparent that the life of the bait will not be shortened during a reasonable period.

Having thus described this invention what I claim is:—

1. An article of the character described comprising stays, a plurality of stationary ribs secured to said stays, hinged ribs secured to one of said stays, locking means between said stationary ribs and hinged ribs, and hooks carried by said stationary ribs.

2. A fish lure comprising a plurality of longitudinally extending wire rib forming members, transversely secured wire stay members, certain of said ribs having their forward ends formed into a securing eye a hinged cover made of a number of wire ribs having their rear ends formed into hinge eyes held to one of said stay members the forward ends of said cover terminating in a securing eye, a link having one of its ends engaged with said securing eyes, and a sleeve on said link to close said link.

In testimony whereof I affix my signature.

CHARLES L. SMITH.